(12) United States Patent
Grimes

(10) Patent No.: US 11,649,179 B2
(45) Date of Patent: May 16, 2023

(54) WATER PURIFICATION SYSTEM

(71) Applicant: Samuel Stephen Grimes, Mount Olive, AL (US)

(72) Inventor: Samuel Stephen Grimes, Mount Olive, AL (US)

( * ) Notice: Subject to any disclaimer, the term of this patent is extended or adjusted under 35 U.S.C. 154(b) by 0 days.

(21) Appl. No.: 17/653,676

(22) Filed: Mar. 7, 2022

(65) Prior Publication Data

US 2022/0281759 A1 Sep. 8, 2022

Related U.S. Application Data

(60) Provisional application No. 63/200,403, filed on Mar. 5, 2021.

(51) Int. Cl.
| | | |
|---|---|---|
| *C02F 1/44* | (2023.01) | |
| *B01D 61/18* | (2006.01) | |
| *B01D 61/20* | (2006.01) | |
| *B01D 65/02* | (2006.01) | |
| *C02F 103/08* | (2006.01) | |
| *C02F 103/00* | (2006.01) | |

(52) U.S. Cl.
CPC .............. *C02F 1/444* (2013.01); *B01D 61/18* (2013.01); *B01D 61/20* (2013.01); *B01D 65/02* (2013.01); *B01D 2313/243* (2013.01); *B01D 2321/30* (2013.01); *B01D 2325/04* (2013.01); *C02F 2103/007* (2013.01); *C02F 2103/08* (2013.01); *C02F 2201/002* (2013.01)

(58) Field of Classification Search
CPC .............. C02F 1/444; C02F 2103/007; C02F 2103/08; C02F 2201/002; B01D 61/18; B01D 61/20; B01D 65/02; B01D 2313/243; B01D 2321/30; B01D 2325/04; B01D 29/15; B01D 24/461; B01D 24/4615; B01D 25/38; B01D 25/383; B01D 29/0077; B01D 29/64; B01D 29/6407; B01D 29/6415; B01D 29/6423; B01D 29/643; B01D 29/6469; B01D 29/6476; B01D 29/6484; B01D 29/6492; B01D 33/46; B01D 33/461; B01D 33/466; E03B 3/04
See application file for complete search history.

(56) References Cited

U.S. PATENT DOCUMENTS

| | | | | |
|---|---|---|---|---|
| 3,171,808 | A * | 3/1965 | Todd ..................... | B01D 61/08 203/DIG. 17 |
| 6,089,790 | A * | 7/2000 | Berry, III .................. | E03B 3/04 138/41 |
| 8,192,622 | B2 * | 6/2012 | Kozey ....................... | E03B 3/04 210/462 |
| 9,982,449 | B1 * | 5/2018 | Kennedy ............... | E04H 4/1245 |
| 2010/0258497 | A1 * | 10/2010 | Morita ................. | B01D 65/003 210/323.2 |

(Continued)

*Primary Examiner* — Pranav N Patel
(74) *Attorney, Agent, or Firm* — Dunlap Bennett & Ludwig PLLC

(57) ABSTRACT

A water purification system and method embodying a submerged conduit with a semipermeable surface, thereby leveraging water pressure to cost-effectively and energy-efficiently purify the water that permeates the semipermeable surface. A intake conduit may provide the semipermeable surface, wherein the system contemplates rotating the intake conduit so that as it rotates it engages brushes or blades that clear the semipermeable surface of obstructions.

10 Claims, 1 Drawing Sheet

(56) References Cited

U.S. PATENT DOCUMENTS

2011/0233132 A1* 9/2011 Wietharn ............ B01D 33/073
                                                    210/403
2014/0339169 A1* 11/2014 Zeren .................. C02F 1/441
                                                    210/170.11
2015/0265952 A1* 9/2015 Berry, IV ............ B01D 33/461
                                                    210/396

* cited by examiner

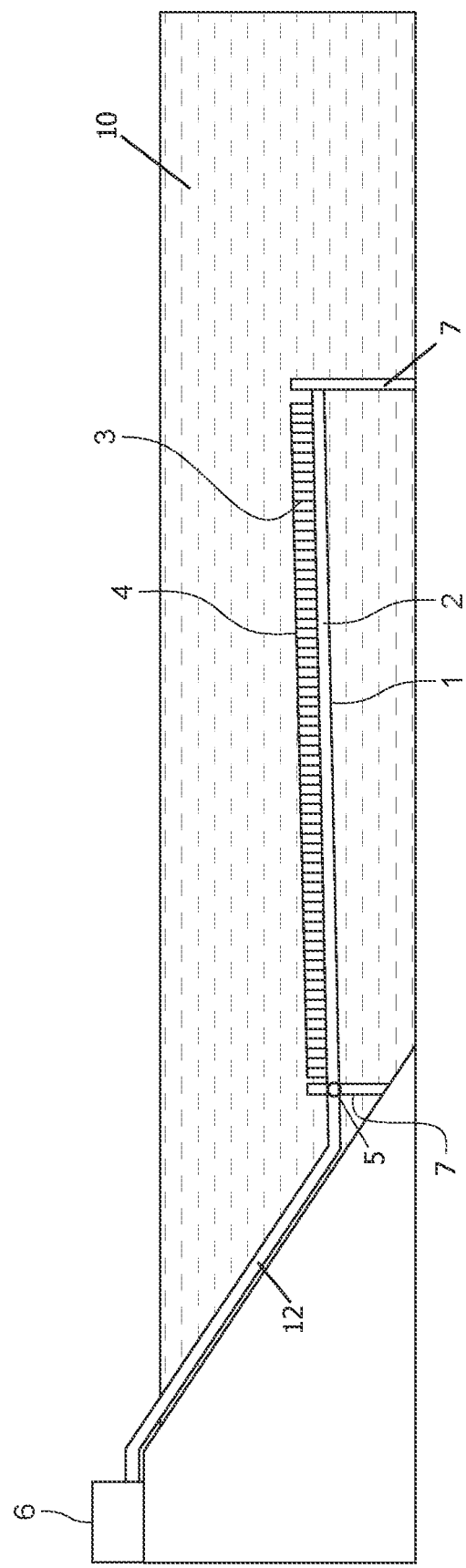

WATER PURIFICATION SYSTEM

CROSS-REFERENCE TO RELATED APPLICATION

This application claims the benefit of priority of U.S. provisional application No. 63/200,403, U.S. provisional application number filed Mar. 5, 2021, the contents of which are herein incorporated by reference.

BACKGROUND OF THE INVENTION

The present invention relates to water purification systems and, more particularly, a water purification system embodying a submerged conduit with a semipermeable surface adapted to utilize water pressure to purify the water that permeates said semipermeable surface.

In many regions, there is a lack of water for purposes of drinking and irrigation, in part, because existing technology is prohibitively expensive and requires large amounts of energy, As can be seen, there is a need for a water purification system embodying a submerged conduit with a semipermeable surface adapted to utilize water pressure to purify the water that permeates said surface, thereby purifying water cheaply without expending a large amount of energy.

Hydrostatic pressure is the pressure that is exerted by a fluid at equilibrium at a given point within the fluid, due to the force of gravity. Hydrostatic pressure increases in proportion to depth measured from the surface because of the increasing weight of fluid exerting downward force from above. Thus, the deeper the depth of an object placed in a fluid the more pressure the fluid exerts on the surface of the object. This is because the weight of the fluid is above it, exerting pressure on the surface of the submerged object, due to the weight of the fluid.

Through leveraging the potential energy of hydrostatic pressure and a semipermeable surface of a submerged conduit, the present invention enables cost-effective, readily available water purification in impoverished regions without expending a large amount of energy.

SUMMARY OF THE INVENTION

In one aspect of the present invention, a water purification system, includes the following: an intake conduit, wherein a portion of a surface of the intake conduit is a semipermeable surface; an uptake conduit fluidly coupled to a proximal end of the intake conduit; and a pump fluidly connected to the uptake conduit.

In another aspect of the present invention, the water purification system of further includes wherein the intake conduit is submerged in a depth within a body of water, wherein the depth urges water from the body of water through the semipermeable surface, wherein the intake conduit is oriented parallel to a water line of the body of water, or wherein the pump is selectively set to a power level to draw water from the depth, wherein the power level is insufficient to draw water from the depth plus one foot, or wherein the semipermeable surface includes a plurality of perforations through a perimetral surface of the intake conduit, wherein each perforation is dimensioned to prevent passage of particulates that are contraindicative of potable water, or wherein each perforation is dimensioned to prevent passage of particulates that are contraindicative of irrigations water, wherein each perforation ranges between 1.0 millimeter and zero millimeters., wherein the semipermeable surface comprises a membrane sheathed over the plurality of perforations, and wherein the semipermeable surface comprises a membrane having a thickness between 0.005 and 0.0005 inches, further including a source of rotary motion operatively associated with the intake conduit so that the intake conduit rotates at between approximately 20 and 30 revolutions per minute; and a clearance element disposed along a portion of the semipermeable surface so that each revolution of the intake conduit urges the semipermeable surface against the clearance element, wherein the clearance element is a brush or a blade.

These and other features, aspects and advantages of the present invention will become better understood with reference to the following drawings, description and claims.

BRIEF DESCRIPTION OF THE DRAWINGS

The sole FIGURE is an elevation view of an exemplary embodiment of the present invention, shown in use.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a water purification system and method embodying a submerged conduit with a semipermeable surface, thereby leveraging water pressure to cost-effectively and energy-efficiently purify the water that permeates the semipermeable surface.

Referring now to the sole FIGURE, the water purification system of the present invention may include an intake conduit 2 sheathed with a semipermeable surface. The semipermeable surface may include perforations along the surface of the intake conduit 2. The semipermeable surface may include said perforations of the intake conduit 2 in combination of a semipermeable membrane 1 sheathed over said perforations. In another embodiments, the semipermeable surface may by an opening in the intake conduit 2, such as its distal end, that is covered by the semipermeable membrane 1.

The intake conduit 2 is submerged in a body of water 10. The intake conduit 2 may be rotatably coupled to a source of rotary motion 5, such as but not limited to a motor or the like. The intake conduit 2 is fluidly coupled to an uptake conduit 12, possibly at the junction of the source of rotary motion 5.

The uptake conduit 12 is, in turn, is operatively associated to a pump 6 adapted to draw fluid in the uptake conduit 12 and, in certain embodiments, by extension the intake conduit 2 from the body of water 10. The pump 6 may be any type of pump (e.g., positive-displacement pump) sufficient to function as disclosed herein—i.e., sufficient to create a vacuum that draws fluid present at the distal end of the uptake conduit 12. In certain embodiments, the pump 6 may be energy-efficiently selected (or set to a specific power setting) so that the pump 6 creates a vacuum just sufficient to draw fluid from the distal end of the uptake conduit 12, but not enough vacuum to draw in fluid from the body of water 10 through the semipermeable surface, into the intake conduit's lumen and from the length therein. As shown in the FIGURE, the uptake conduit 12 may have a bend as it transitions from a horizontal (relative to the water surface of the body of water 10) orientation to an upward orientation as it extends toward the pump 6.

Supported within the body of water 10 may be a plurality of brushes 3 and scrapping blades 4. The plurality of brushes 3 and scrapping blades 4 may be supported by structures 7 (including but not limited to stanchions, lattices, or the like) that also supports the intake conduit 2.

The source of rotary motion 5 rotates the submerged intake conduit 2 and thus its semipermeable surface thereof against the brushes 3 or scraping blades 4, thereby keeping the semipermeable surface free from occlusions.

The concept of the invention is to utilize the potential energy of hydrostatic pressure to purify ocean, lake, and river water for irrigation and human consumption. At 100 meters of water depth, the pressure is 160 psi. This pressure is adequate for the surrounding water pressure to force sea water through a semipermeable membrane 1 or filter having openings fine enough to exclude salt particles and other particles contraindicative particulate for drinking and/or irrigation water from passing through the membrane and allowing only the purified water to enter the intake conduit 2. The semipermeable membrane 1 may be water permeable nylon membrane, a water-permeable regenerated cellulose membrane, or other water-permeable membranes known to those skilled in the art. The semipermeable membrane 1 can be from about 0.0005 to about 0.005 inch thick. The semipermeable membrane 1 may be microfiltration, ultra-filtration, or anti-salt membranes.

This purified water is pumped to the surface by the pump 6, as the intake conduit 2 is typically oriented horizontal relative to said water surface, and so a vacuum sufficient to draw water from the distal end of the uptake conduit 12 would be sufficient to draw the purified water in the intake conduit 2.

The semipermeable membrane 1 could cover a perforated intake conduit 2 or merely the open end of the intake conduit 2. The intake conduit 2 may be made from plasticized materials, metal, or any material sufficient to function as disclosed herein. The intake conduit 2 may be a repurposed pipe that a user punctures to form perforations and/or adds a semipermeable membrane 1 over a distal end thereof or over the newly perforated outer surface. The semipermeable surface may be quickly obstructed by salt and other particles which could form thereon. The outer surface must be cleared of the accumulation of deposits via the brushes 3 or scraping blades 4 to continue to operate.

If a perforated intake conduit 2 is used, it can be continually rotated by the source of rotary motion 5 which would rotate the tube against the brushes 3 or scraping blades 4 which would keep the semipermeable surface (including they semipermeable membrane) clear of obstructions so that the water pressure can continue to press the water through the membrane and into the empty intake conduit 2 where it can be pumped to the surface.

Or, in the alternative, if the semipermeable membrane 1 is stretched across the open end of the pipe, reinforced by a lattice, wherein brushes 3 or blades 4 could be moved backward and forward across the membrane.

However, this process could be more efficient if the intake conduit 2 itself were perforated with punctures so small that the perforated conduit itself forms the semipermeable surface, allowing the water pressure to force the sea water through the micro punctures and into the intake conduit 2.

The intake conduit 2 may be rotated against the pressures of the brushes 3 or scraping blades 4 encircling it for preventing accumulation of particles which would otherwise occlude the punctures or perforations.

If additional measures are needed, the rotating intake conduit 2 could be stopped at partial turns to allow micro needles to be inserted into the precisely engineered punctures to keep the perforations clear.

Additionally, the present invention could provide fresh water for maritime vessels or as emergency equipment.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A water purification system comprising:
    an intake conduit submerged a depth beneath a surface of a body of water, wherein a portion of a surface of the intake conduit is a semipermeable surface;
    an uptake conduit fluidly and rotatably coupled to the intake conduit;
    a pump fluidly connected to the uptake conduit;
    two stanchions connected to a floor of the body of water, wherein each stanchion is disposed adjacent a proximal end and a distal end, respectively, of the intake conduit; and
    a clearance element extending substantially an entire length of the intake conduit, wherein the clearance element is supported by the two stanchions,
    wherein hydrostatic pressure of the body of water urges water from the body of water through the semipermeable surface,
    whereby the pumped water is potable.

2. The water purification system of claim 1, wherein the pump is selectively set to a power level to draw water from the depth, wherein the power level is insufficient to draw water from the depth plus one foot.

3. The water purification system of claim 1, wherein the semipermeable surface includes a plurality of perforations through a perimetral surface of the intake conduit.

4. The water purification system of claim 3, wherein each perforation has a surface area between 1.0 micrometers squared and zero micrometers squared.

5. The water purification system of claim 3, wherein the semipermeable surface comprises a membrane sheathed over the plurality of perforations, wherein the membrane has a thickness between 0.005 and 0.0005 inches.

6. The water purification system of claim 1, further comprising a source of rotary motion operatively associated with the intake conduit so that the intake conduit rotates at between 20 and 40 revolutions per minute.

7. The water purification system of claim 6, further comprising a clearance element disposed along a portion of the semipermeable surface so that each revolution of the intake conduit urges the semipermeable surface against the clearance element.

8. The water purification system of claim 7, wherein the clearance element is a brush or a blade.

9. The water purification system of claim 3, wherein each perforation has a surface area between 0.01 micrometers squared and zero micrometers squared.

10. The water purification system of claim 1, wherein the pump is sufficient to create a vacuum to assist the hydrostatic pressure of the body of water to urge water from the body of water through the semipermeable surface.

\* \* \* \* \*